United States Patent [19]

Sulmont et al.

[11] 4,335,064

[45] Jun. 15, 1982

[54] PROCESS FOR PACKING ELECTROLYSIS CELLS FOR THE PRODUCTION OF ALUMINUM

[75] Inventors: Benoît Sulmont, Paralia Distomon, Greece; Gérard Hudault, St. Jean de Maurienne, France

[73] Assignee: Aluminium Pechiney, Lyons, France

[21] Appl. No.: 206,540

[22] PCT Filed: Nov. 7, 1979

[86] PCT No.: PCT/FR79/00101

§ 371 Date: Jul. 7, 1980

§ 102(e) Date: Jun. 11, 1980

[87] PCT Pub. No.: WO80/00978

PCT Pub. Date: May 15, 1980

[30] Foreign Application Priority Data

Nov. 7, 1978 [FR] France ............................... 78 32055

[51] Int. Cl.[3] ............................................. F27D 1/16

[52] U.S. Cl. ..................................................... 264/30

[58] Field of Search .......................................... 264/30

[56] References Cited

U.S. PATENT DOCUMENTS

| | | | |
|---|---|---|---|
| 3,717,602 | 2/1973 | Koch | 264/30 X |
| 4,052,288 | 10/1977 | Sala | 264/30 X |
| 4,111,711 | 9/1978 | Kiehl | 106/97 |
| 4,174,972 | 11/1979 | Drouzy | 106/64 |

FOREIGN PATENT DOCUMENTS 1076613 4/1980 Canada .

*Primary Examiner*—Thomas P. Pavelko

*Attorney, Agent, or Firm*—Dennison, Meserole, Pollack & Scheiner

[57] ABSTRACT

The invention relates to a process for packing, also known as lining, electrometallurgical furnaces.

The packing is produced from a concrete which is poured in situ or in precast blocks, composed of a setting cement having a low water retention capacity and low porosity and of an aggregate of which at least a proportion is a carbonaceous product such as anthracite. This packing has a noteworthy resistance to the constituents of fluoride-based igneous electrolysis baths and to liquid aluminum.

Application to the packing of igneous electrolysis cells for the production of aluminum.

6 Claims, No Drawings

PROCESS FOR PACKING ELECTROLYSIS CELLS FOR THE PRODUCTION OF ALUMINUM

The present invention relates to a process for making the packing for electrometallurgical furnaces and, in particular, for cells for the production of aluminum by electrolysis of alumina dissolved in molten cryolite.

A cell for the production of aluminum is formed by a metal box, the length of which currently ranges from 5 to 8 meters and the width from 2 to 4 meters. The bottom of the box is first packed to a thickness on the order of 18 to 42 centimeters with electrically and thermally insulating refractory materials and is resistant to possible infiltration by aluminum and fluorinated products. The assembly of "cathode blocks" which constitutes the cathode of the electrolysis cell and which will be located directly in contact with the sheet of liquid aluminum produced by the cell is then arranged. Next, the joints have to be produced between the cathode blocks and then the lateral packing of the cell, that is to say the space between the lateral walls of the box and the cathode blocks has to be filled with a substance which is resistant to the chemical action of the aluminum and of the fluorinated bath at a temperature in the area of 1000° C.

This packing has to possess a certain number of other qualities, in particular high mechanical strength as it has to withstand high stresses, dimensional stability during baking, the ability to receive a reinforcement such as a conventional concrete, high resistance to oxidation and to erosion by the electrolysis bath and the metal.

This packing operation is also known as "lining" or "luting" because it is usually carried out using "lining paste" or "lute", that is to say a mixture based on pitch and coke which is positioned while hot and tamped.

The care taken in the production of this "lining" and the quality of the products used determine to a very large extent the service life of an electrolysis cell, as infiltration of metal and molten cryolite through imperfect or fissured joints make it unserviceable after a short time.

The process forming the object of the invention is based on the use, for the lining operation, of a product composed of a non-carbonaceous binder and an aggregate of which at least a proportion is constituted by a carbonaceous product.

Up until now it has been maintained that only carbonaceous products could be used in contact with the electrolyte and the liquid aluminum with the exception, however, of special products such as boron nitride which is too expensive for industrial use.

Now it has surprisingly been found that it is possible to use lining products which are not completely carbonaceous and, in particular, concretes composed of hydraulically or chemically setting cement and a charge (generally known as aggregate), all or a part of which is constituted carbonaceously, such as anthracite, anode or cathode waste, or material recovered, for example, from the dismantling of unused cells. It has been observed that the proportion of carbonaceous material in the aggregate must be at least 5% to obtain the desired properties.

In view of the temperature to which the concrete will be brought and the need for its porosity to be as low as possible, it is preferable to use, for making it up, a cement having a low water retention capacity, that is to say in practice a cement having a low CaO content as this element is largely responsible for the reduction in the refractoriness and the water retention.

In particular, the chemically setting cement forming the subject of French Pat. No. 2,359,090 in the name of the Societe Europeenne de Produits Refractaires is eminently suitable. It is characterized by a mixture of from 25 to 30% by weight of an aluminous cement selected from among the cements based on calcium mono-aluminate and di-aluminate, from 35 to 40% by weight of vitreous silica in particles of from 0.01 to 0.1 micrometers and from 35 to 45% of an inert charge in particles of from 1 to 100 micrometers. In addition this cement contains less than 15%, and even less than 10% of CaO.

Other types of cement having small lime content are also suitable for carrying out the invention.

As stated above, the aggregate can be composed partly or completely of a carbonaceous substance. The non-carbonaceous part can be selected from among the refractory products preferably having a thermal conductivity which is suitable for the type of cell, relatively low electrical conductivity, and suitable resistance to the liquid aluminum and the molten electrolyte such as black corundum or silico-aluminous products.

A concrete of this type can be produced by the conventional methods of vibro-tamping or pouring into shuttering, but it is often preferable first to make up some blocks having shapes and dimensions which are adapted to the packing to be produced, to heat them so as to set them and drive off the majority of the water, then to position them in the cell and to grout them in the usual way.

The following examples describe an embodiment of the invention.

EXAMPLE 1

To a concrete composed of 15% of setting cement having a low lime content according to the above-mentioned French Patent No. 2,359,090, and of 85% of calcined anthracite in particles having the following granulometric distribution: from 2 to 4 mm: 41%; around 2 mm: 16%; from 0.5 to 1 mm: 13%; 0.5 mm: 30%, were added 60 liters of water per ton of dry composition.

Some blocks for packing the walls and the talus of an electrolysis cell for the production of aluminum were made from this concrete, these blocks having a prismatic shape of trapezoidal cross-section with a unit weight on the order of 200 kg and being provided with two handling hooks which are cut off later using a blow torch.

After heating to 450° C., the following characteristics were measured:

| | |
|---|---|
| Volumetric mass | 1.77–1.79 |
| Resistance to crushing | 5000 to 6000 daN/cm$^2$ |
| Porosity | 3.5 to 7% |
| Coefficient of thermal expansion between 20 and 1000° C. | 4.3 $10^{-6}$ |

| Chemical composition by weight | |
|---|---|
| $Al_2O_3$ | 17.6% |
| $SiO_2$ | 9.4% |
| CaO | 2.7% |
| $Na_2O$ | 1.1% |
| $Fe_2O_3$ | 0.7% |
| C | 63.6% |

-continued

| | |
|---|---|
| Water | less than or equal to 5% |

The following was measured after baking at 950° C.:

| | |
|---|---|
| Volumetric mass | 1.68 |
| Resistance to crushing | 3500 daN/cm$^2$ |
| Electrical conductivity | not measurable (virtually zero) |
| Thermal conductivity at 400° (kcal/m.h. °C.) | $\lambda$ = 2.5 to 3 (compared to $\lambda$ = 3.1 for the conventional lining paste) |

The blocks were positioned in the cell then grouted with the conventional lining paste based on coke and pitch.

The time saved was about 30% relative to a conventional lining operation carried out by tamping hot lining paste.

After several months of operation, the electrolysis cell produced in this way showed no sign of breaking down.

The process forming the object of the invention is applied for lining cells for the manufacture of aluminum by electrolysis but it can be applied in a similar manner to any type of electrometallurgical furnace.

What is claimed is:

1. A process for packing electrometallurgical furnaces and, in particular, cells for the production of aluminum by electrolysis of alumina dissolved in molten cryolite, characterized by the following stages:

(a) forming a setting cement having a low water retention capacity and low open porosity after setting comprising as essential constituents from about 25% to about 30% by weight of an aluminous cement, from about 35% to about 40% of vitreous silica in particles of from about 0.01 to about 0.1 micrometers, from about 35% to about 45% of an inert charge in particles of from about 1 to about 100 micrometers, and from about 10% to about 15% of CaO;

(b) adding an aggregate of which at least a fraction is constituted by a carbonaceous product while the other fraction is constituted by a non-carbonaceous product;

(c) adding a quantity of water not exceeding 10% and preferably 6% of the dry composition;

(d) applying the concrete thus obtained to use.

2. A process for packing metallurgical furnaces according to claim 1, characterized in that the furnace is packed in situ.

3. A process for packing metallurgical furnaces according to claim 1, characterized in that the concrete obtained is first placed in molds providing blocks which, after removal from the mold, allow the furnace lining to be produced by juxtaposition and/or superimposition.

4. A process for packing metallurgical furnaces according to claim 3, characterized in that the blocks are heated after removal from the mold to a temperature of at least 120° C. and, preferably above 400° C.

5. A process for packing metallurgical furnaces according to claim 1, characterized in that the cement has a lime content of less than 15%.

6. A process for packing metallurgical furnaces according to claim 1, characterized in that the aggregate comprises at least 5% of carbonaceous product.

* * * * *